United States Patent [19]
Yancy

[11] 4,314,477
[45] Feb. 9, 1982

[54] SAILBOAT WIND DIRECTION INDICATOR

[76] Inventor: Mark E. Yancy, 4004 La Salle St., San Diego, Calif. 92110

[21] Appl. No.: 111,212

[22] Filed: Jan. 11, 1980

[51] Int. Cl.³ .................... G01P 13/02; G01W 1/00
[52] U.S. Cl. ..................................... 73/188; 116/265
[58] Field of Search ................. 73/188, 189; 116/330, 116/328, 329, 333, 265, 264

[56] References Cited

U.S. PATENT DOCUMENTS

| | | | |
|---|---|---|---|
| 3,049,008 | 8/1962 | Polster | 73/188 |
| 3,049,668 | 8/1962 | Borell | 116/330 X |
| 3,233,456 | 2/1966 | Mills | 73/188 |
| 3,371,529 | 3/1968 | Tillman | 73/188 |
| 3,845,734 | 11/1974 | Demos | 73/188 X |
| 4,080,826 | 3/1978 | Perretta | 73/188 |

Primary Examiner—Daniel M. Yasich
Attorney, Agent, or Firm—Brown & Martin

[57] ABSTRACT

A wind direction indicator for a sailboat includes a mounting bracket for mounting on the forestay of a sailboat with a support frame extending forward of the mounting bracket and including a generally Y-shaped wire frame with the arms of the Y serving as optimum direction indicator means for alignment with a wind direction indicator in the form of a wind vane. The mounting or support frame includes pendulum for maintaining the frame of the indicator device in a level position. Optimum heading for the boat is indicated when the wind direction is in alignment with one of the arms of the frame.

4 Claims, 6 Drawing Figures

SAILBOAT WIND DIRECTION INDICATOR

BACKGROUND OF THE INVENTION

The present invention relates to wind direction indicators and pertains particularly for a wind indicator for indicating optimum heading and sail trim for a sailboat.

The heading of a sailboat when leading into the wind is critical for optimum speed for a given wind. This is especially critical when racing since almost imperceptible differences in speed and wind shifts can make a difference in the winning or losing of a race.

Wind indicators are known which indicate the direction of the wind, but combination wind, optimum heading, and sail position indicators are not presently known for sailboats. The optimum heading of the boat relative to the wind when beating into the wind is critical to obtain the maximum speed out of the boat. Any slight variations from the optimum heading can result in a slight drop in the maximum speed of the boat with the result that the race can be lost. Such slight differences in speed are almost imperceptible without a very sensitive speed indicator. Most small sailboats do not carry speed indicators and thus the differences in speed can only be detected relative to a competing boat.

It is accordingly desirable to have some means that indicates both the wind direction, as well as the optimum heading of the sailboat relative to the wind direction.

SUMMARY AND OBJECTS OF THE INVENTION

It is accordingly the primary object of the present invention to overcome the above problems of the prior art.

Another object of the present invention is to provide a wind direction combination wind direction and boat heading indicator for a sailboat.

A further object of the present invention is to provide an optimum heading wind indicator for a sailboat.

In accordance with the primary aspect of the present invention wind and heading indicator includes frame support means, a wind indicator mounted on the frame support means and indicia means indicating the optimum heading of the boat and trim of the sails when in certain positions with respect to the wind indicating means.

BRIEF DESCRIPTION OF THE DRAWINGS

The above and other objects and advantages of the present invention will become apparent from the following description when read in conjunction with the drawings, wherein.

DETAILED DESCRIPTION OF A PREFERRED EMBODIMENT

Figure 1:
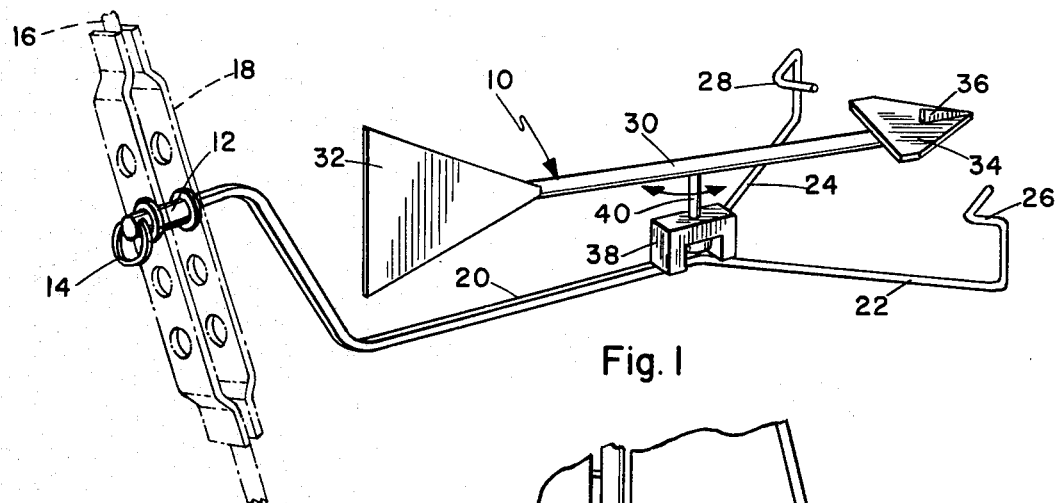
FIG. 1 is a perspective view of the invention.
Figures 2, 6:
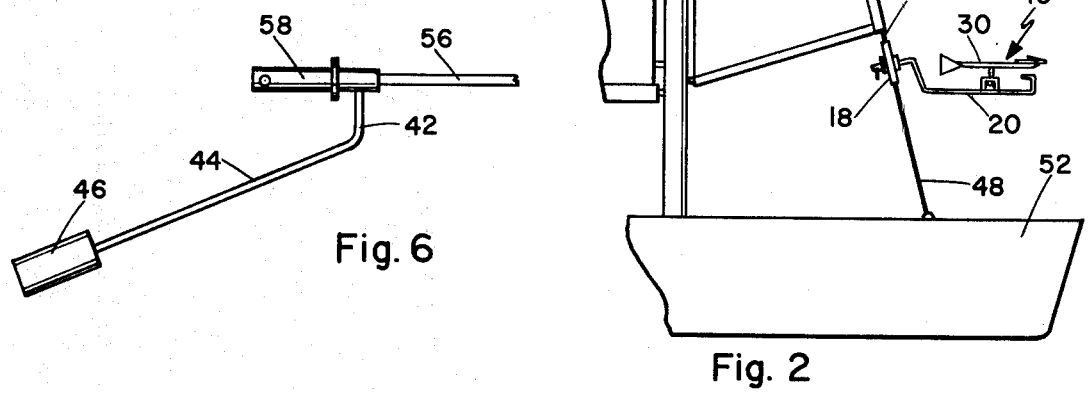
FIG. 2 is a side elevational view of the portion showing the mounting of the indicator.
FIG. 6 is an elevational view of a portion showing an alternate pendulum construction.

Turning to FIG. 1 of the drawing, there is illustrated a perspective view of the invention designated generally by the numeral 10. The combined wind and heading indicator comprises a mounting shaft 12, which in this case is adapted to be journalled in a bore in a bracket secured to the forestay of a sailboat. In the illustrated embodiment, the mounting shaft 12 includes a retaining ring 14 for securing into holes in the bracket 18 on the forestay 16 of a boat, as shown in FIG. 2. The mounting journal 12 defines a cylindrical bearing or journal portion on one end of a generally Y-shaped frame 20. The support frame 20 is of a generally Y-shaped configuration, including a pair of arms 22 and 24 defining indicia means for the wind heading indicator. These arms may include upwardly extending tip portions 26 and 28 to enhance the visibility thereof. Inwardly extending tip portions thereof help in the visibility and alignment thereof with a wind vane comprising an elongated body portion 30 having a vertical stabilizer 32 and a forward pointer 34. A vertical sight member 36 extends upward from the forward pointer member 34. The sight member 36 is adapted to align precisely with the indicia means or members 26 and 28. The leg 20 of the support frame is of a generally Z-shaped configuration with the main portion and mass thereof suspended like a pendulum below the pivot axis of journal 12. This pendulum action keeps the indicator level when the boat is heeled over in a wind.

The wind vane is mounted about vertical axis on a mounting support bracket 38 having a vertical journal 40 securing or journalizing the vane member in the bracket 38. This is disposed at the intersection of the arms 22 and 24 so that the wind vane body portion 30 can slign precisely with either one of arms 22 and 24. The arms 22 and 24 are extended outward at approximately 45° angle to either side of the main body portion 20 of the frame. This extension or angle of the members 22 and 24 can be adjusted for each respective boat and may vary with different boats in a specific class. In any event, these arms can be bent for the precise alignment desired.

Figure 3:
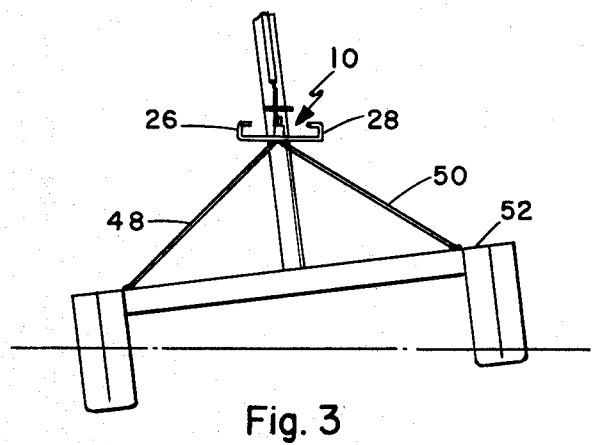
FIG. 3 is a front view of a boat, showing the self leveling action of the indicator.

It is important that the table or platform frame for the indicator maintain its level orientation when the boat is heeled over. The pendulum balance structure balances the weight of the structure around its mounting axis or journal 12, to permit a single point connection or support of the device on a jib stay or the like. As illustrated in FIG. 3, when the boat is heeled over as shown, the weight or the structure acting as a pendulum will be such as to maintain the device in a level position.

It will be appreciated that the heading of a boat into the wind will vary with the particular boat and will even vary slightly with different boats within a single class. The sail structure can have an effect on this, such as for example, the fullness or the flatness of the sail configuration. Additionally, the tautness of the sail under pressure will also have an effect on this heading.

Figure 5:
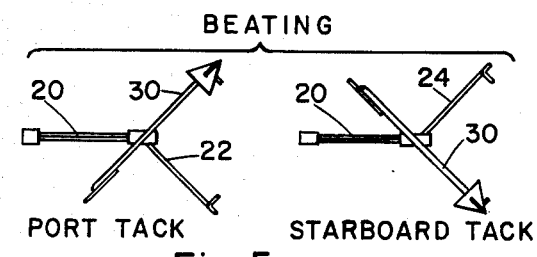

Thus, with this arrangement, the indicator arms 22 and 24 may be deflected slightly in either direction to orientate them with the wind vane when an optimum heading is achieved. Thus, while the usual heading is approximately 45° off the wind direction, this can vary and can be compensated with by the structure of the present invention. The present invention has its most important use when leading into the wind. The present indicator is ideal for this use and when the wind vane and indicia members are properly adjusted, the optimum speed can be obtained when heading into the wind. The present indicator is ideal for this use and when the wind vane and indicia members are properly adjusted, the optimum speed can be obtained when heading into the wind. As shown in FIG. 5, when on a port tack, the wind vane 30 will point towards the wind with the axis of the boat extending along the axis of the support rod 20. Thus, the boat heading will be off the wind heading by an amount determined by the angle between the indicator arm 24 and the axis of the support rod 20.

Similarly, when tacking or beating into the wind on a starboard tack, the ideal wind heading will preferably be when the wind vane 30 is aligned with the indicator arm 22.

It is also important when sailing to know in which direction the wind is coming. With the present invention disposed and supported on a gib stay or the like, forward of the main sails of the boat, the indicator will be unaffected by the wind on the sails themselves. Thus, a true wind heading can generally be established. The wind heading indicated, of course, by the wind vane will be slightly off the true wind heading because of the speed of the boat. With the speed of the boat the apparent wind heading will be slightly different from the true wind heading. However, with proper adjustment of the indicator of the present invention the optimum heading can be obtained for optimum efficiency of the boat.

Figure 4:
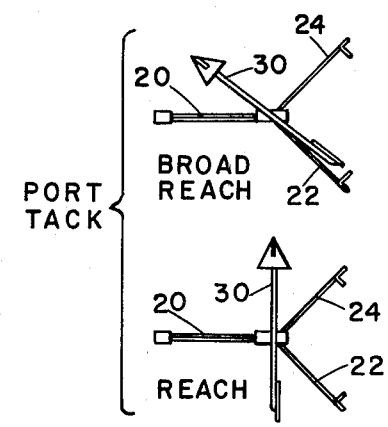
FIGS. 4 and 5 illustrate various alignments of the indicator.

As shown in FIG. 4, the indicator will have various other orientations with respect to the indicator arms 22 and 24 when on reach and broad reach. The setting of the sails relative to the wind can be important in obtaining the optimum speed when on the reach. Accordingly, the indicator can assist in this determination. The indicator device can also be useful in quickly teaching a novice how to sail. A few simple diagrams can show proper heading and sail setting relative to wind direction which is clearly shown by the device.

An alternate embodiment shown in FIG. 6 shows a counter balancing member for providing self leveling of the indicator device comprises a pendulum arm 42 of a generally L-shape, having an outwardly extending arm portion 44 on which is mounted a counter balance weight 46. This arm and weight is secured at one end to frame structure 56 similar to the frame 20 and extends downward and backward therefrom. A journal 58 similar to that in the prior embodiment mounts in holes in a bracket such as illustrated at 18. The configuration illustrated in this embodiment is also designed for use with a catamaran as illustrated, having rigging such as the forestay 16 with stays 48 and 50 connect at bracket 18, extend outward and are secured to laterally spaced portions of the boat hull or frame 52. In this embodiment, the frame structure 56 is pivotally mounted by journal 58 in bracket 18 at the juncture of the stays 16, 48 and 50, with the counterbalance arm and weight extending downward to swing in the area between the stays 48 and 50. Where a single stay is provided, it may be necessary to provide a forwardly extending bracket to provide clearance of the counterbalance with the forestay. Additionally, the counterbalance may be branched outward to extend to either or both sides of the single stay.

While I have illustrated and described my invention by means of specific embodiments, it is to be understood that numerous changes and modifications may be made therein without departing from the spirit and scope of the invention as defined in the appended claims.

Having described my invention, I now claim:

1. A sailboat optimum heading indicator comprising:
   support means for mounting forward of the foremost sail on a sailboat, said support means including a generally Y-shaped frame having a pair of forwardly extending arms and an elongated backward extending body having means defining a journal extending generally horizontally outward at the end thereof for rotatably mounting in a mounting bracket,
   a vertical pivot bracket at the juncture of the arms with said body,
   wind direction responsive means mounted on said pivot bracket for pivoting about a vertical axis,
   the arms of said frame defining indicia means positioned for alignment with said wind direction indicating means when an optimum wind heading is obtained,
   wherein the mass of said Y-shaped frame is off set below said journal, and,
   the mass of said frame acts as a pendulum for maintaining said frame substantially level.

2. The heading indicator of claim 1, wherein said indicia means defines indicia means for each of port and starboard tacks.

3. The heading indicator of claim 2 or 1, wherein wind direction responsive means is a wind vane pivotal about a vertical axis on said pivot bracket.

4. The heading indicator of claim 1, wherein said wind direction responsive means comprises a wind vane, and
   said support means includes counterbalance means for counterbalancing said support means about said mounting bracket.

* * * * *

UNITED STATES PATENT AND TRADEMARK OFFICE
CERTIFICATE OF CORRECTION

PATENT NO. : 4,314,477
DATED : February 9, 1982
INVENTOR(S) : Mark E. Yancey

It is certified that error appears in the above-identified patent and that said Letters Patent are hereby corrected as shown below:

On the title page, [76] Inventor: "Yancy" should read --Yancey--.

Signed and Sealed this

First Day of June 1982

|SEAL|

Attest:

GERALD J. MOSSINGHOFF

Attesting Officer     Commissioner of Patents and Trademarks